(12) United States Patent
Singh et al.

(10) Patent No.: US 8,082,416 B2
(45) Date of Patent: Dec. 20, 2011

(54) SYSTEMS AND METHODS FOR UTILIZING AN EXTENDED TRANSLATION LOOK-ASIDE BUFFER HAVING A HYBRID MEMORY STRUCTURE

(75) Inventors: Gaurav Singh, Los Altos, CA (US); Dave Hass, Santa Clara, CA (US); Daniel Chen, Sunnyvale, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 0 days.

(21) Appl. No.: 12/859,013

(22) Filed: Aug. 18, 2010

(65) Prior Publication Data

US 2010/0318763 A1    Dec. 16, 2010

Related U.S. Application Data

(63) Continuation of application No. 11/652,827, filed on Jan. 11, 2007, now Pat. No. 7,797,509.

(51) Int. Cl.
*G06F 12/08* (2006.01)
(52) U.S. Cl. ............... 711/207; 711/2; 711/6; 711/104; 711/108; 711/E12.061; 711/E12.016
(58) Field of Classification Search .................. None
See application file for complete search history.

(56) References Cited

U.S. PATENT DOCUMENTS

| | | | |
|---|---|---|---|
| 6,078,987 A * | 6/2000 | Kongetira .................... | 711/108 |
| 6,088,784 A | 7/2000 | Choquette | |
| 6,412,056 B1 * | 6/2002 | Gharachorloo et al. ...... | 711/202 |
| 6,519,684 B1 * | 2/2003 | Moyer .......................... | 711/134 |
| 6,944,039 B1 | 9/2005 | Nataraj et al. | |
| 6,944,709 B2 | 9/2005 | Nataraj et al. | |
| 7,366,829 B1 * | 4/2008 | Luttrell et al. ............... | 711/108 |
| 7,461,295 B1 | 12/2008 | Iyengar et al. | |
| 7,555,594 B2 | 6/2009 | Venkatachary | |
| 7,627,721 B2 | 12/2009 | Hass | |
| 7,711,893 B1 | 5/2010 | Venkatachary | |
| 2005/0044308 A1 | 2/2005 | Rashid et al. | |
| 2005/0165966 A1 | 7/2005 | Gai et al. | |
| 2008/0162868 A1 * | 7/2008 | Glew ............................ | 711/203 |

OTHER PUBLICATIONS

Non-Final Office Action dated Aug. 8, 2009 for U.S. Appl. No. 11/652,827.
Notice of Allowance dated Mar. 22, 2010 for U.S. Appl. No. 11/652,827.
Notice of Allowance dated Jun. 30, 2010 for U.S. Appl. No. 11/652,827.

* cited by examiner

*Primary Examiner* — Reginald Bragdon
*Assistant Examiner* — Aracelis Ruiz
(74) *Attorney, Agent, or Firm* — Vista IP Law Group, LLP

(57) ABSTRACT

Extended translation look-aside buffers (eTLB) for converting virtual addresses into physical addresses are presented, the eTLB including, a physical memory address storage having a number of physical addresses, a virtual memory address storage configured to store a number of virtual memory addresses corresponding with the physical addresses, the virtual memory address storage including, a set associative memory structure (SAM), and a content addressable memory (CAM) structure; and comparison circuitry for determining whether a requested address is present in the virtual memory address storage, wherein the eTLB is configured to receive an index register for identifying the SAM structure and the CAM structure, and wherein the eTLB is configured to receive an entry register for providing a virtual page number corresponding with the plurality of virtual memory addresses.

29 Claims, 9 Drawing Sheets

SYSTEMS AND METHODS FOR UTILIZING AN EXTENDED TRANSLATION LOOK-ASIDE BUFFER HAVING A HYBRID MEMORY STRUCTURE

This application is a continuation of U.S. patent application Ser. No. 11/652,827, now U.S. Pat. No. 7,797,509, filed Jan. 11, 2007, the disclosures of which are expressly incorporated herein by reference.

BACKGROUND

1. Field of Invention

The present invention relates generally to memory devices, and more particularly to an extended translation look-aside buffer (eTLB) for improving performance and reducing power consumption of a memory structure, and methods of memory management using the same.

2. Description of Related Art

In general, a translation look-aside buffer (TLB) is used to reduce virtual address translation time. A TLB is a table in the processor's memory that contains information about the pages in memory the processor has accessed recently. The table cross-references a program's virtual addresses with the corresponding absolute addresses in physical memory that the program has most recently used. A TLB enables faster computing because it caches the virtual to physical address translations locally. A TLB may be implemented in a number of ways. For example, a TLB may be enabled in a fully associative content addressable memory (CAM) structure. A CAM is a type of storage device which includes comparison logic with each bit of storage. A data value may be broadcast to all words of storage and then compared with the values there. Words matching a data value may be flagged in some way. Subsequent operations can then work on flagged words, e.g. read them out one at a time or write to certain bit positions in all of them. Fully associative structures can therefore store the data in any location within the CAM structure. Comparison logic, however, requires comparison circuitry, which occupies physical space—physical space which, in other structures may be utilized to provide more memory. As such, CAM structures may not be as densely configured as other memory structures. Further, because of the comparison circuitry, CAM structures have relatively high power requirements.

In other examples, a TLB may be enabled in a set associative memory (SAM) structure, such as a random access memory (RAM) structure. SAM structures organize caches so that each block of memory maps to a small number of sets or indexes. Each set may then include a number of ways. A data value may return an index whereupon comparison circuitry determines whether a match exists over the number of ways. As such, only a fraction of comparison circuitry is required to search the structure. Thus, SAM structures provide higher densities of memory per unit area as compared with CAM structures. Further, because of reduced comparison circuitry, SAM structures have lower power requirements as compared with CAM structures.

As may be appreciated, both of the memory structures described above may provide specific advantages in a processing system. In general, however, designers must typically choose between memory structures when developing a system under an existing architecture. For example, the Microprocessor without Interlocked Pipeline Stages (MIPS) architecture, which is well-known in the art, specifies a fully associative TLB based translation mechanism. The mechanism utilizes the EntryHi, EntryLo1, EntryLo0 and Index architectural registers to perform functions such as reading, writing and probing the TLB. These mechanisms and functions assume that the TLB is a fully associative structure (i.e. a CAM structure) that is in compliance with the requirements of the MIPS architecture. Therefore, increasing the size of the TLB necessitates the addition of more fully associative CAM structures. An increase in CAM structures, in turn, requires a commensurate increase in space and power to accommodate the additional CAM structures. Currently, the MIPS architecture cannot utilize a more space and power efficient SAM structure.

It may therefore be desirable to provide a system which includes an extended TLB (eTLB) that utilizes both CAM structures and SAM structures so that the relative advantages of both structures may be realized. The invention is particularly useful in systems that utilize existing registers and mechanism as specified by the MIPS architecture.

Therefore, systems and methods for utilizing an extended translation look-aside buffer having a hybrid memory structure are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, extended translation look-aside buffers (eTLB) for converting virtual addresses into physical addresses are presented, the eTLB including, a physical memory address storage having a number of physical addresses, a virtual memory address storage configured to store a number of virtual memory addresses corresponding with the physical addresses, the virtual memory address storage including, a set associative memory structure (SAM), and a content addressable memory (CAM) structure; and comparison circuitry for determining whether a requested address is present in the virtual memory address storage, wherein the eTLB is configured to receive an index register for identifying the SAM structure and the CAM structure, and wherein the eTLB is configured to receive an entry register for providing a virtual page number corresponding with the plurality of virtual memory addresses. In some embodiments, the eTLB further includes: a memory management unit (MMU) configuration register for configuring an MMU such that the eTLB is enabled; and an eTLB configuration register for configuring the eTLB to provide for a thread to access the SAM structure.

In other embodiments, multi-core computer processing systems having a hybrid memory structure are presented, the systems including: a number of multi-threaded CPUs for executing a number of threads; a physical storage location for storing data corresponding with the number of threads, the physical storage location connected with the number of multi-threaded CPUs by a cache coherent fabric; and an extended translation look-aside buffer (eTLB) for storing a virtual address into a physical address, the eTLB including, a physical memory address storage having a number of physical addresses, a virtual memory address storage configured to store a number of virtual memory addresses corresponding with the number physical address, the virtual memory address storage including, a set associative memory structure (SAM), a content addressable memory (CAM) structure, and comparison circuitry for determining whether a requested address is present in the virtual memory address storage, wherein the eTLB is configured to receive an index register for identifying the SAM structure and the CAM structure, and wherein the eTLB is configured to receive an entry register for providing a virtual page number corresponding with the plurality of virtual memory addresses. In some embodiments, systems are presented that further include: a memory management unit (MMU) configuration register for configuring an MMU such that the eTLB is enabled; an eTLB configuration register for configuring the eTLB to provide for at least one thread to access the SAM structure. In some embodiments, the eTLB is MIPS compliant.

In other embodiments, methods of utilizing an extended translation look-aside buffer (eTLB) are presented, the eTLB including a set associative memory (SAM) structure, and a content addressable memory (CAM) structure, the method including: writing an index register into an entry, the index register including an index, a way ID, and structure ID, wherein the structure ID identifies the SAM structure and the CAM structure; writing the index register into a random entry into the CAM structure if the structure ID is zero and into the SAM structure is the structure ID is non-zero; probing the eTLB for a requested address to determine whether the requested address is in the eTLB; and reading the requested address such that a corresponding physical address is found. In some embodiments, methods presented further include: translating a virtual address (VA) into a physical address wherein the translating includes, reading a thread ID of a thread of a current program; if the eTLB is not enabled, searching the CAM structure for the VA, if the VA is found, reading the corresponding physical address from the CAM structure; and if the eTLB is enabled, searching substantially simultaneously the CAM structure and an eTLB enabled SAM structure for the VA, if the VA is found in the CAM structure, reading the corresponding physical address from the CAM structure, and if the VA is found in the SAM structure, reading the corresponding physical address from the SAM structure. In some embodiments, searching the eTLB enabled SAM structure includes: indexing the eTLB enabled SAM structure such that a matching index corresponding with the requested address is returned; reading a plurality of ways associated with the matching index; and comparing the plurality of ways such that a matching way corresponding with the requested address is returned.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
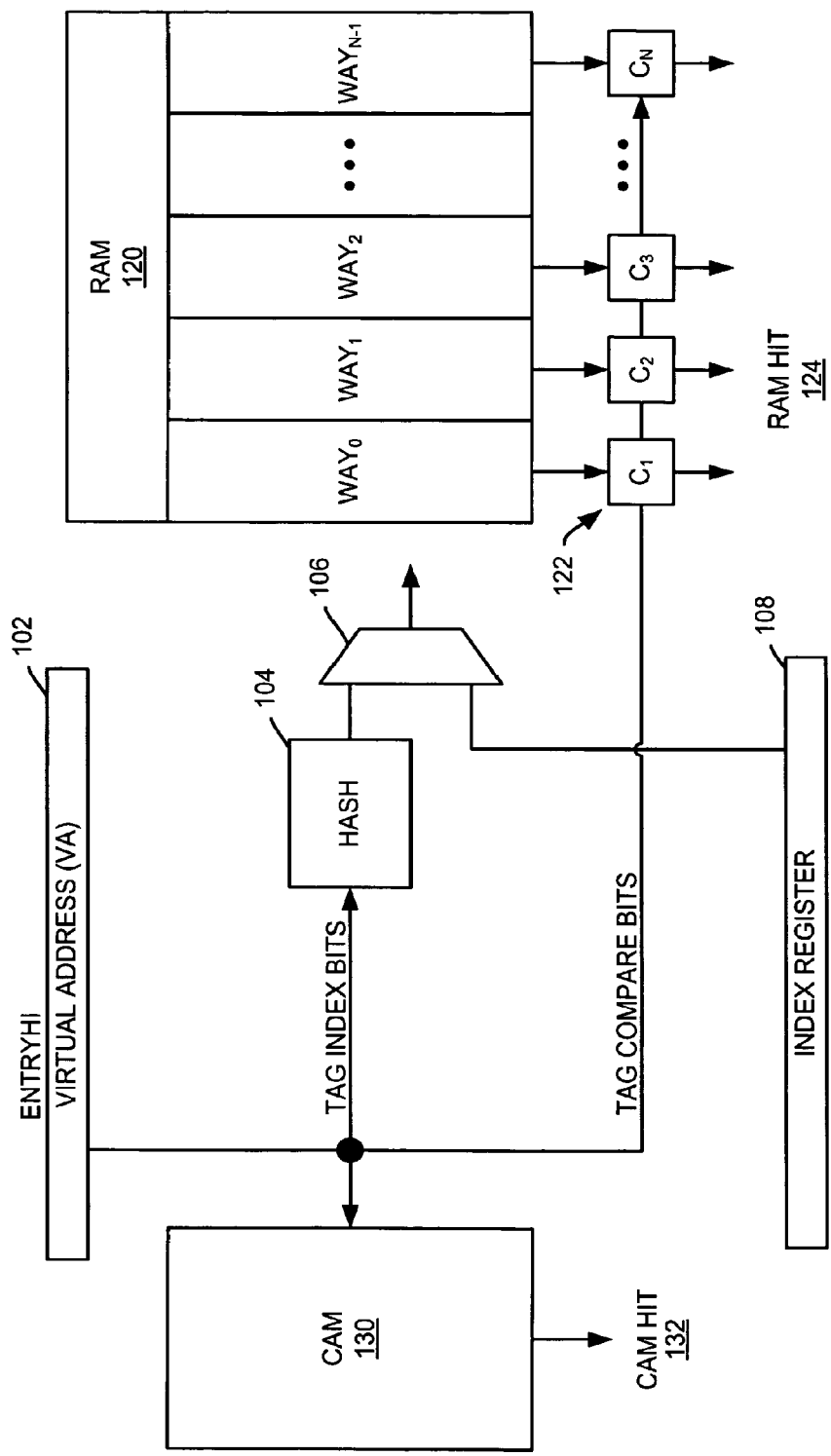
FIG. 1 is an illustrative representation of an extended translation look-aside buffer (eTLB) architecture in accordance with embodiments of the present invention.

FIG. 1 is an illustrative representation of an extended translation look-aside buffer (eTLB) architecture in accordance with embodiments of the present invention. A conventional TLB, as noted above, typically utilizes either a content addressable memory structure (CAM) or a set associative memory (SAM) structure, but not both. In utilizing a hybrid system that incorporates a CAM structure and one or more SAM structures, embodiments of an eTLB may benefit from particular advantages provided by both structures at the same time.

Thus, CAM structure 130 provides a first memory structure for use with an eTLB in an embodiment of the present invention. As may be appreciated, CAM structures include comparison logic for each bit of storage. Comparison logic in turn requires comparison circuitry, which occupies physical space—physical space which, in other structures may be utilized to provide more memory. As such, CAM structures may not be as densely configured as other memory structures. Further, because of the comparison circuitry, CAM structures have relatively high power requirements. However, one benefit of a CAM structure is that searches conducted over a CAM structure happen simultaneously over all bits. Thus, a complete search of a CAM structure occurs over a single clock cycle. Another benefit of a CAM structure is that an address may reside in any entry in the CAM, therefore the CAM structure may be easily configured with a "wired" space, which is a protected memory space. This wired space can contain any address translation which the operating system wants to retain in the TLB. As may be appreciated, when a CAM structure is searched, a hit may occur. A CAM hit 132 results when a match with a virtual address (VA) 102 from an entry hi register occurs. A hit may result in a data retrieval from a data store. As may be appreciated, a ternary CAM (TCAM) may, in some embodiments, be utilized. A TCAM cell stores an extra state (i.e. a "don't care" state), which necessitates two independent bits of storage. When a "don't care" state is stored in the cell, a match occurs for that bit regardless of the search criteria.

SAM structure 120 provides a second memory structure for use with an eTLB in an embodiment of the present invention. SAM structures organize caches so that each block of memory maps to a small number of cache lines or indexes. Each index may then include a number of ways. Thus, an index register 108 may indicate a location across n-ways. In one embodiment, a 4-way set associative memory structure may be utilized. Comparison logic 122 compares the n-ways identified by index register 108 with tag compare bits from VA 102 and returns a SAM hit 124, if any. A hit may result in data retrieval from a data store. A SAM structure may be densely manufactured because only a fraction of comparison logic is utilized over a CAM structure having the same amount of memory. Additionally, because significantly less comparison logic is utilized, power requirements are also much lower over a similarly sized CAM structure. As may be appreciated, in a single SAM structure page size is not easily variable. In some embodiments, a SAM structure page size is set to 4 KB. Page size for a SAM structure may be programmatically established by setting a PageMask field of an eTLB configuration register to a desired page size in embodiments of the present invention. CAM structures, on the other hand, support variable page sizes and may include a wired or protected space. Thus, in one embodiment, a SAM structure page size of an eTLB is 4 KB and CAM page size is a variable page size greater than 4 KB. In some embodiments, a hash table 104 may be utilized to hash tag index bits from VA 102 for use with a SAM structure. In other embodiments, MUX 106 may be utilized when accessing SAM 120.

Figure 2:
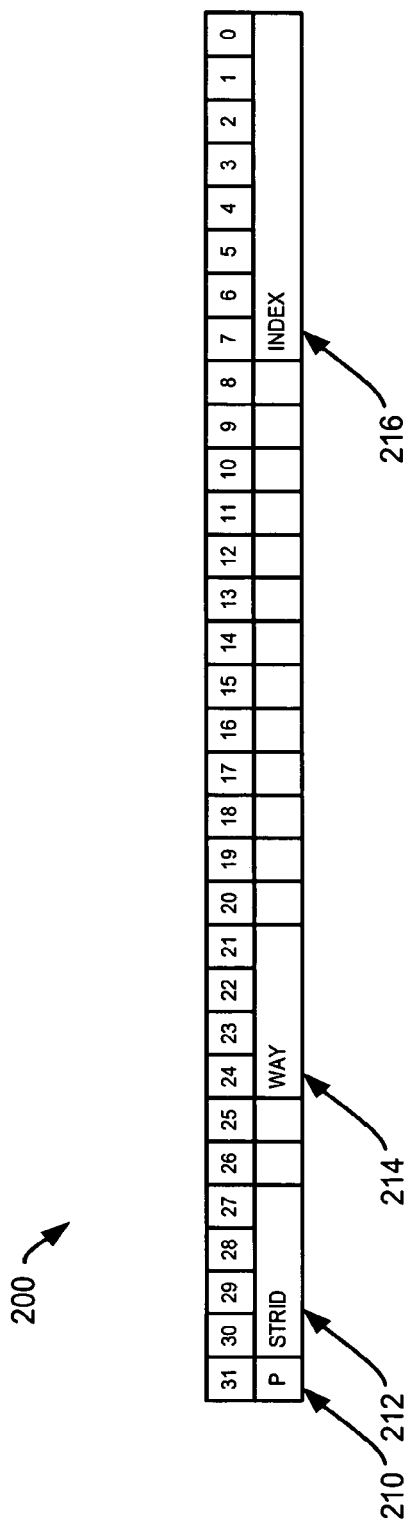
FIG. 2 is an illustrative representation of an index register in accordance with embodiments of the present invention.

FIG. 2 is an illustrative representation of an index register 200 in accordance with embodiments of the present invention. Index register 200 may be utilized in coordination with an eTLB architecture for providing memory management functions. Index register 200 may include a probe bit 210 that may be utilized to indicate a match in response to an eTLB probe command. An eTLB probe command is discussed in further detail below for FIG. 6. Index register 200 may further include a structure ID (STRID) 212, which may be utilized to identify whether index register 200 corresponds with a CAM structure or with a SAM structure. In some embodiments, compatibility with legacy systems requires that the STRID of a CAM structure be equal to zero. Any number of structure IDs may be utilized without departing from the present invention. Index register 200 may further include way identifier (way ID) 214. Way ID 214 may be utilized to identify a way in a SAM structure. In some embodiments, SAM structures include: RAM, DRAM, SRAM, extended RAM, extended DRAM, extended SRAM, and a register file without departing from the present invention. Index register 200 may further include an index 216. Index 216 may include a VA corresponding with a CAM structure and a hashed index corresponding with a SAM structure.

Figure 3:
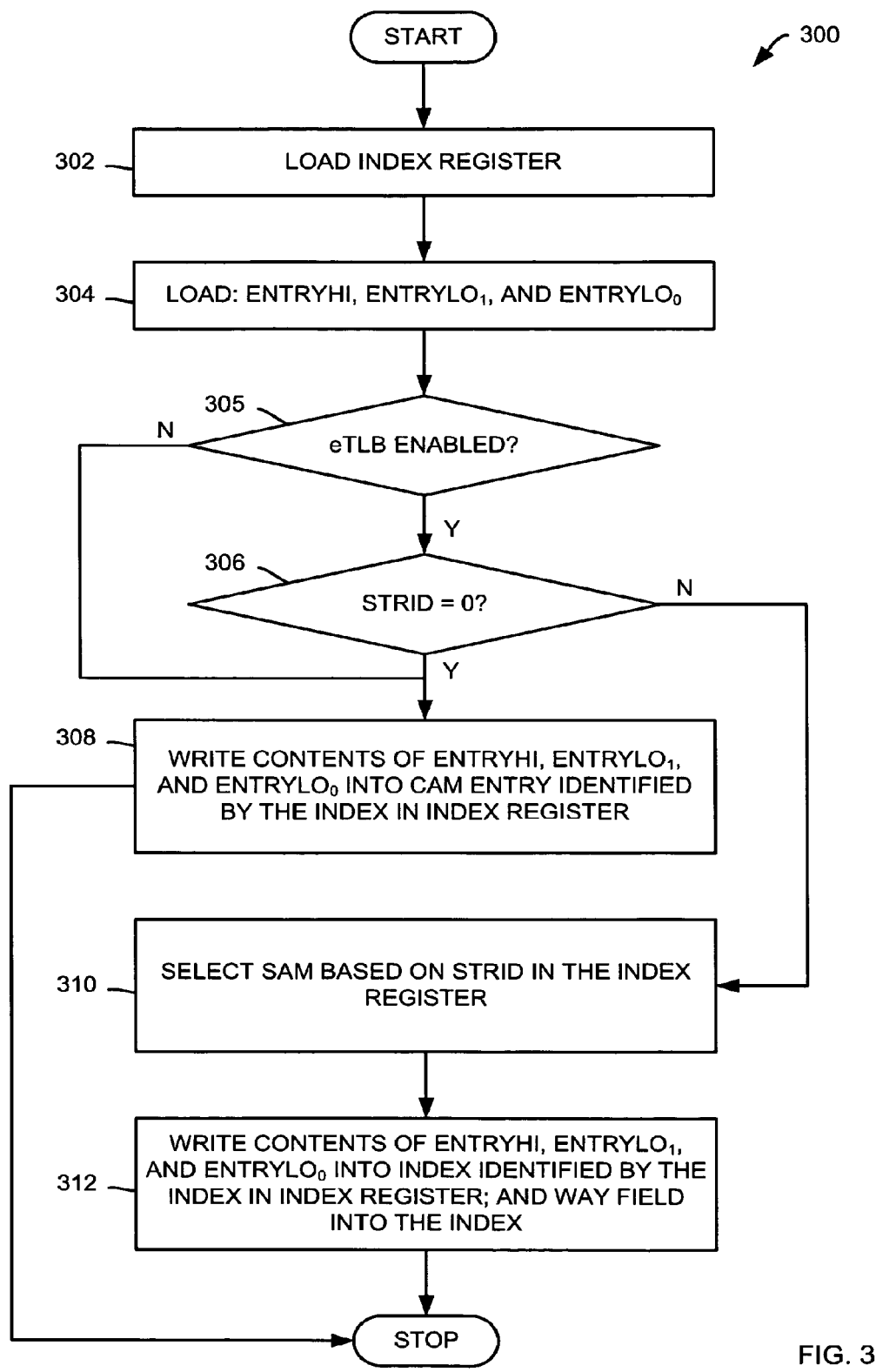
FIG. 3 is an illustrative flowchart of an eTLB write index in accordance with embodiments of the present invention.

FIG. 3 is an illustrative flowchart of an eTLB write index 300 in accordance with embodiments of the present invention. An eTLB write index command loads an index register with an index, a way ID if applicable, and a structure ID. Thus, at a first step 302, an index register is loaded into memory. In addition to the physical page or frame number, each entry of the TLB contains attributes of the page. This information may be written into entryhi, $entrylo_0$, and $entrylo_1$ registers. At a next step 304, entryhi, $entrylo_0$, and $entrylo_1$ are loaded into memory. The method then determines whether an eTLB has been enabled at a step 305. As may be appreciated, methods described herein may be utilized with several system configurations without departing from the present invention. Thus, in one embodiment of the present invention, methods are provided that access a TLB (non-enabled eTLB) utilizing a CAM structure. Accessing a TLB utilizing a CAM structure is specified by the MIPS architecture. If the method determines that an eTLB is not enabled at a step 305, the method continues to a step 308 to write the contents of entryhi, $entrylo_0$, and $entrylo_1$ into the CAM entry identified by the index, whereupon the method ends.

If the method determines that an eTLB is enabled at a step 305, the method continues to determine whether a structure ID (STRID) is non-zero at a step 306. In this step, the method determines to which memory structure an index or VA is written. If the method determines that the structure ID is zero at a step 306, then the structure corresponding with the index register loaded at a step 302 is a CAM structure. The method then writes the contents of entryhi, $entrylo_0$, and $entrylo_1$ into the CAM entry identified by the index, which is a VA at a step 308, whereupon the method ends. If the method determines that the structure ID is non-zero at a step 306, then the structure corresponding with the index register loaded at a step 302 is a SAM. The method then selects the SAM structure corresponding with the STRID from the loaded index register at a step 310. The method then writes the contents of entryhi, $entrylo_0$, and $entrylo_1$ into the SAM entry identified by the index, and the way ID into the index register at a step 312, whereupon the method ends.

Figure 4A:
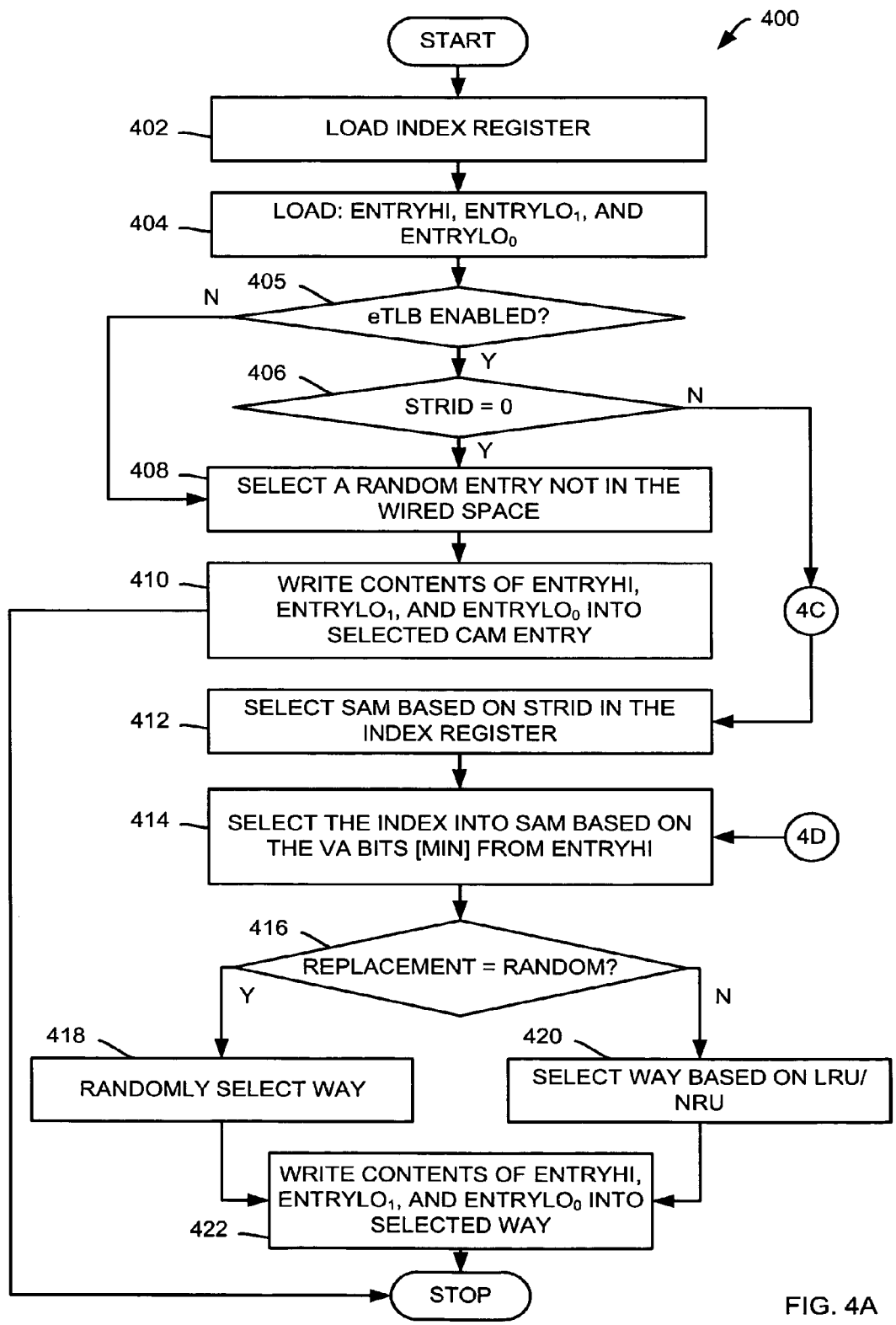
FIGS. 4A-B are illustrative flowcharts of an eTLB write random in accordance with embodiments of the present invention.
Figure 4B:
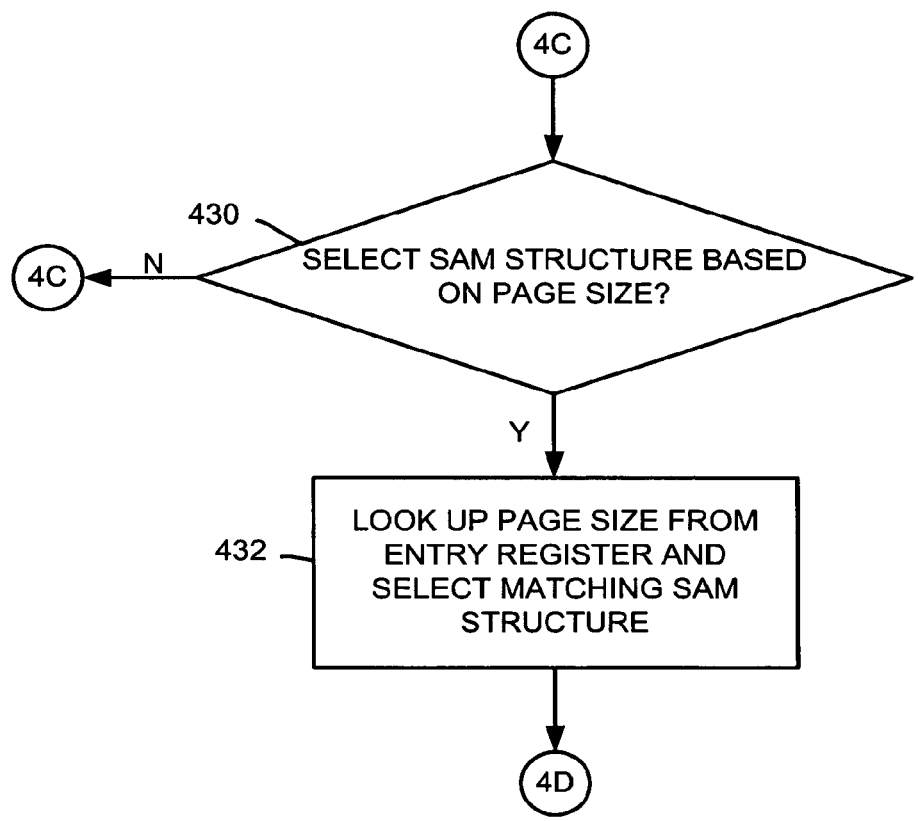

FIGS. 4A-B are illustrative flowcharts of an eTLB write random 400 in accordance with embodiments of the present invention. An eTLB write random command writes an entry corresponding with a hashed index. The determination of whether to write into a CAM structure or a SAM may, in some embodiments, be based on page size. For example, in one embodiment, all 4K pages may be written into SAM while all other pages and wired pages may be written into CAM. Referring to FIG. 4A, at a first step 402, an index register is loaded. At a next step 404, entryhi, $entrylo_0$, and $entrylo_1$ are loaded. The method then determines whether an eTLB has been enabled at a step 405. As may be appreciated, methods described herein may be utilized with several system configurations without departing from the present invention. Thus, in one embodiment of the present invention, methods are provided that access a TLB (non-enabled eTLB) utilizing a CAM structure. Accessing a TLB utilizing a CAM structure is specified by the MIPS architecture.

If the method determines that an eTLB is not enabled at a step 405, the method continues to a step 408 to select a random entry in the CAM structure that is not in a wired space. As may be appreciated, a wired space represents protected memory. That is, memory that cannot be evicted from the TLB. The method then writes the contents of entryhi, $entrylo_0$, and $entrylo_1$ into the random CAM at a step 410, whereupon the method ends. If the method determines that an eTLB is enabled at a step 405, the method continues to determine whether a structure ID (STRID) is non-zero at a step 406. If the method determines that the structure ID is zero at a step 406, then the structure corresponding with the index register loaded at a step 402 is a CAM structure. The method then selects a random entry in the CAM structure that is not in a wired space at a step 408. As may be appreciated, a wired space represents protected memory. That is, memory that cannot be evicted from the eTLB. The method then writes the contents of entryhi, entrylo$_0$, and entrylo$_1$ into the random CAM at a step 410, whereupon the method ends.

If the method determines that the structure ID is non-zero at a step 406, then the structure corresponding with the index register loaded at a step 402 is a SAM structure. The method then selects a SAM structure corresponding with the STRID from the loaded index register at a step 412. The method then selects the index of the SAM based on the VA bits from the entryhi. The method then determines whether a random replacement is desired at a step 416. If the method determines at a step 416 that a random replacement is desired, the method selects a random way at a step 418. If the method determines at a step 416 that a random replacement is not desired, the method selects a way based on LRU or NRU at a step 420. The method then writes the contents of entryhi, entrylo$_0$, and entrylo$_1$ into the set associative entry identified by the index, and the way ID into the index register at a step 422, whereupon the method ends.

Referring to FIG. 4B, the flowchart illustrated represents optional steps for the described method in FIG. 4A. If the method determines that the structure ID is non-zero at a step 406, the method may optionally determine whether a SAM structure should be selected based on page size at a step 430. As noted above, some SAM structures, such as a RAM structure does not typically support variable pages within banks. Thus, a SAM structure may, in some embodiments, be selected based on page size. If the method determines at a step 430 to select a SAM structure based on page size, then the method looks up page sizes from an entry register and selects any matching SAM structures, whereupon the method continues to a step 414. If the method determines at a step 430 not to select a SAM structure based on page size, the method returns to a step 412.

Figure 5:
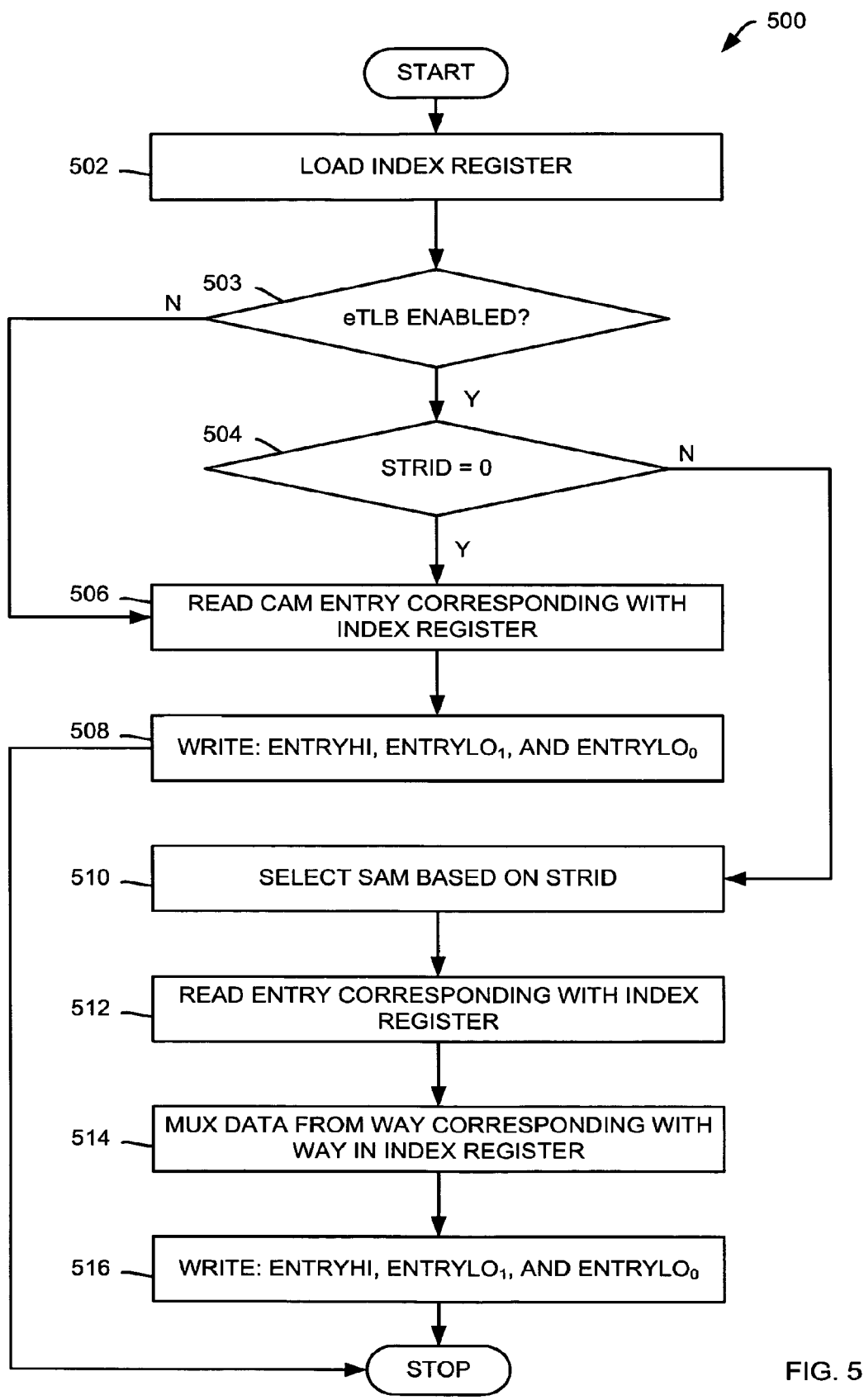
FIG. 5 is an illustrative flowchart of an eTLB read in accordance with embodiments of the present invention.

FIG. 5 is an illustrative flowchart of an eTLB read 500 in accordance with embodiments of the present invention. An eTLB read command utilizes an index register in embodiments of the present invention to read an entry. In addition, entryhi, entrylo$_0$, and entrylo$_1$ are updated with the contents of the data storage. Thus, at a first step 502, an index register is loaded. The method then determines whether an eTLB has been enabled at a step 503. As may be appreciated, methods described herein may be utilized with several system configurations without departing from the present invention. Thus, in one embodiment of the present invention, methods are provided that access a TLB (non-enabled eTLB) utilizing a CAM structure. Accessing a TLB utilizing a CAM structure is specified by the MIPS architecture. If the method determines at a step 503 that an eTLB is not enabled, the method continues at a step 506, to read the CAM entry corresponding with the index register loaded at a step 502. The method then updates the entryhi, entrylo$_0$, and entrylo$_1$ with the contents of the data storage at a step 508, whereupon the method ends.

If the method determines that an eTLB is enabled at a step 503, the method then determines whether a structure ID (STRID) is non-zero at a step 504. If the method determines that the structure ID is zero at a step 504, then the structure corresponding with the index register loaded at a step 502 is a CAM structure. The method continues at a step 506, to read the CAM entry corresponding with the index register loaded at a step 502. The method then updates the entryhi, entrylo$_0$, and entrylo$_1$ with the contents of the data storage at a step 508, whereupon the method ends. If the method determines at a step 504 that the structure ID is non-zero, then the structure corresponding with the index register loaded at a step 502 is a SAM structure. The method then selects at a step 510, the SAM structure corresponding with the STRID in the loaded index register at a step 502. The method continues at a step 512, to read the entry corresponding with the index register loaded at a step 502. Data from the way corresponding with the index register is MUXed at a step 514. MUXing data is well-known in the art and may be utilized without limitation without departing from the present invention. The method then updates the entryhi, entrylo$_0$, and entrylo$_1$ with the contents of the data storage at a step 516, whereupon the method ends.

Figure 6:
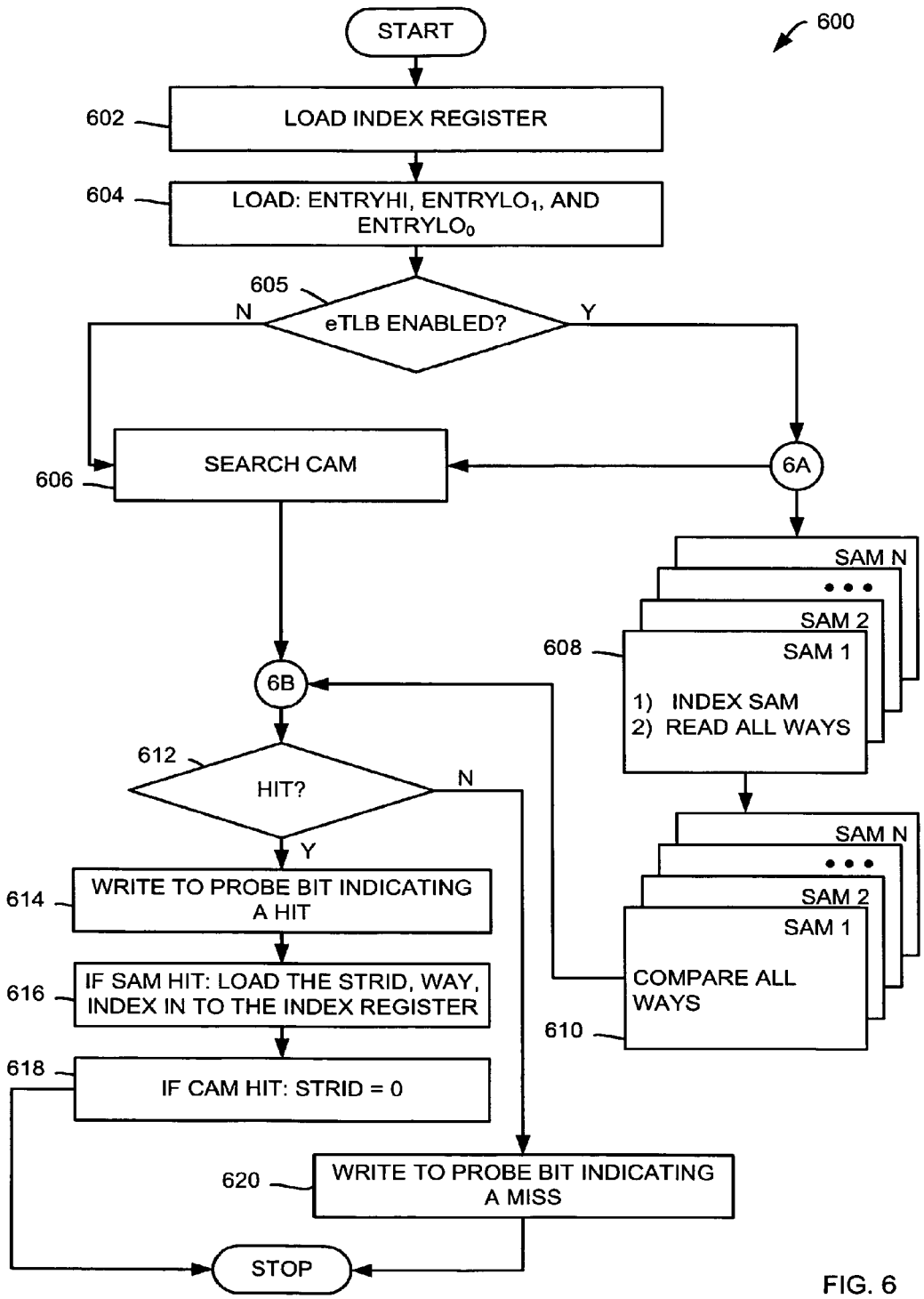
FIG. 6 is an illustrative flowchart of an eTLB probe in accordance with embodiments of the present invention.

FIG. 6 is an illustrative flowchart of an eTLB probe 600 in accordance with embodiments of the present invention. eTLB probes all associated memory structures for a match with a requested address. Both SAM and CAM may be probed simultaneously, substantially simultaneously, or sequentially as desired without departing from the present invention. Thus, at a first step 602, an index register is loaded into memory. At a next step 604, entryhi, entrylo$_0$, and entrylo$_1$ are loaded into memory. The method then determines whether an eTLB has been enabled at a step 605. As may be appreciated, methods described herein may be utilized with several system configurations without departing from the present invention. Thus, in one embodiment of the present invention, methods are provided that access a TLB (non-enabled eTLB) utilizing a CAM structure. Accessing a TLB utilizing a CAM structure is specified by the MIPS architecture. If the method determines at a step 605 that an eTLB is not enabled, the method continues to a step 606 to search the CAM using a VA from the entryhi as a search key. The method then continues to a step 612 to determine whether a hit has occurred. If no hit occurs at a step 612, the method continues to a step 620 to write to the probe bit to indicate a miss whereupon the method ends. If the method determines a hit (or match) has occurred at a step 612, the method continues to a step 614 to write a zero in the probe failure bit to indicate a hit. A probe bit is illustrated in FIG. 2, 210 above. If a CAM has produced a hit, then, at a step 618, the structure ID is set to zero.

If the method determines at a step 605 that an eTLB is enabled, the method continues to a step 606, to search the CAM using a VA from the entryhi as a search key. The method substantially simultaneously continues to a step 608 to 1) Use a subset of the VA bits [m:n] to index the SAM, and 2) Read all indexed ways. The upper bits of the VA [MSB; m+1] are then compared with all the indexed ways at a step 610. As may be appreciated, any number of SAM structure banks may be searched without departing from the present invention. Thus, SAM structures 1 to n may be searched at steps 608 to 610. The method continues to a step 612 to determine whether a hit has occurred. If no hit (i.e. no match) occurs at a step 612, the method continues to a step 620 to write to a probe bit to indicate a "miss" whereupon the method ends. If the method determines a hit (or match) has occurred at a step 612, the method continues to a step 614 to write a zero in a probe bit to indicate a "hit." A probe bit is illustrated in FIG. 2, 210 above. If a SAM structure has produced a hit, then at a step 616, the structure ID of the SAM structure, the "hit" way, and the index are loaded into an index register. If a CAM structure has produced a hit, then at a step 618, the structure ID is set to zero.

Figure 7:
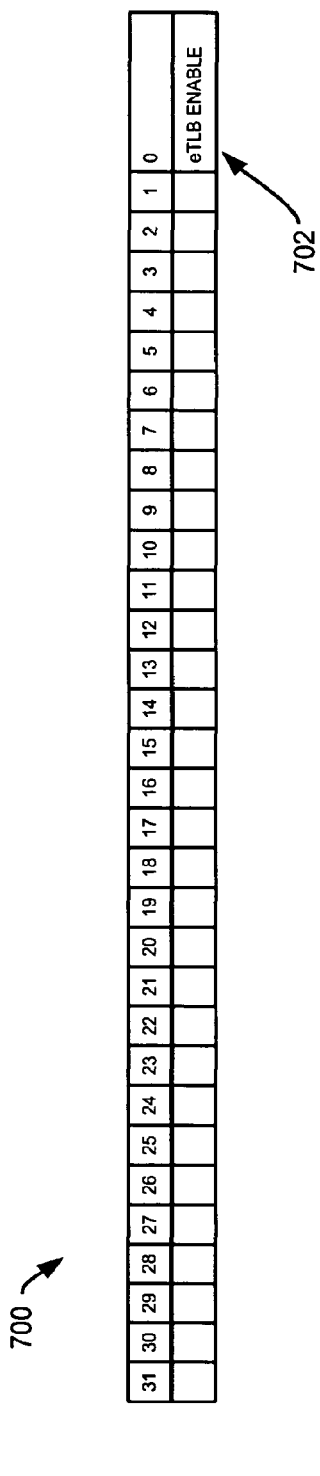
FIGS. 7A-B are illustrative representations of a memory management unit (MMU) configuration register and an eTLB configuration register in accordance with embodiments of the present invention.

FIG. 7A is an illustrative representation of a memory management unit (MMU) configuration register 700 in accordance with embodiments of the present invention. As discussed above, methods disclosed herein provide for utilization of both CAM structures and SAM structures. In some embodiments, a number of configuration registers may be required for associated hardware such as an MMU, for example. An MMU is a class of computer hardware components responsible for handling memory accesses requested by a CPU. Among the functions of such devices are the translation of virtual addresses to physical addresses (i.e., virtual memory management), memory protection, cache control, bus arbitration, and, in simpler computer architectures (especially 8-bit systems), bank switching. Thus, an MMU utilizing embodiments herein may be configured with an MMU configuration register 700, which contains an eTLB enable field 702 that enables eTLB features such as those described herein. As may be appreciated, the representation provided is for illustrative purposes only and should not be construed as limiting. Any available bits in a configuration register may be utilized to enable eTLB features without departing from the present invention. Furthermore, any manner of configuring an MMU that is well-known in the art may be utilized without departing from the present invention.

FIG. 7B is an illustrative representation of an eTLB configuration register 720 in accordance with embodiments of the present invention. An eTLB configuration register 700 may be utilized to enable the use of SAM structures. As such, eTLB configuration register 700 contains a number of fields for enabling the use of SAM structures. A PageMask field 726 may be utilized to determine a page size supported by a particular SAM structure. In one embodiment a PageMask field for a SAM structure may determine a 4K page size. A structure ID (STRID) field 728 may be utilized to identify a particular SAM structure. As may be appreciated, any number of SAM structures may be utilized in embodiments of the present invention. An M bit 722 may be utilized to indicate whether an additional eTLB configuration register exists for another SAM structure. An eTLB configuration register corresponds with a SAM structure in a one-to-one relationship. When multiple SAM structures are utilized, then a corresponding number of additional eTLB configuration registers are required. Additional eTLB configurations may be indicated by an M bit such as M bit 722 illustrated. In this manner, eTLB registers may be associated to specify the behavior of multiple SAM structures.

A thread enable field 724 may be enabled to indicate the threads whose translations will reside in a selected SAM structure. Thus, a configuration may include or exclude a particular thread on a selected SAM structure. In one embodiment, a single thread may be configured to access a single SAM structure. In another embodiment, a single thread may be configured to access multiple SAM structures. In another embodiment, multiple threads may be configured to access a single SAM structure. In another embodiment, multiple threads may be configured to access several SAM structures. An eTLB enable field 730 may be utilized to indicate whether eTLB functionality is enabled for a particular memory structure. As may be appreciated, the representation provided is for illustrative purposes only and should not be construed as limiting. Any available bits in a configuration register may be utilized to enable eTLB features without departing from the present invention.

Figure 8:
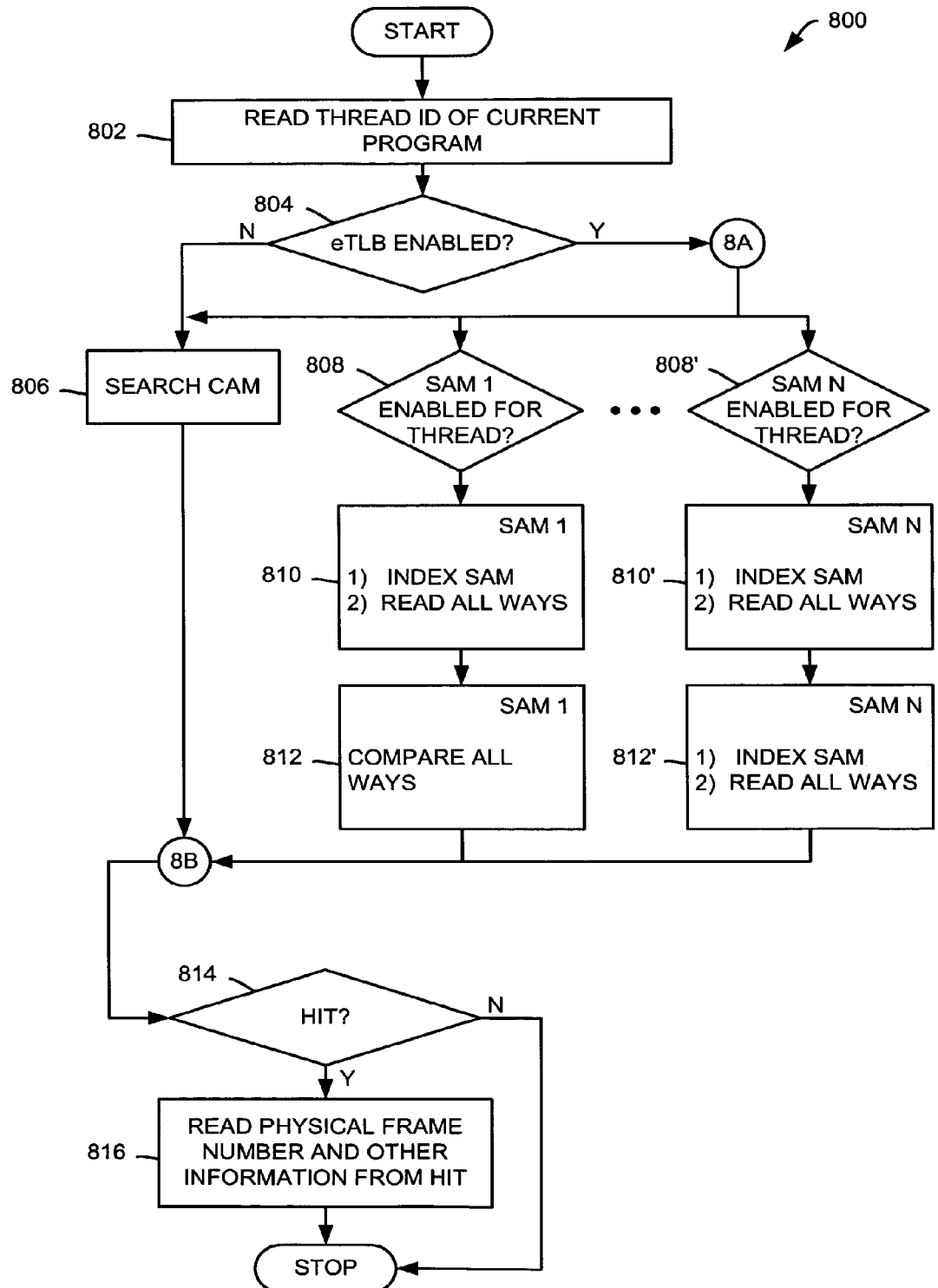
FIG. 8 is an illustrative flowchart of utilizing an eTLB to translate a virtual address into a physical address or page frame number (PFN).

FIG. 8 is an illustrative flowchart 800 of utilizing an eTLB to translate a virtual address into a physical address or page frame number (PFN). At a first step 802, the method reads a thread ID of a current program. As noted above, threads may be configured to access memory structures in various ways without departing from the present invention. The method then determines whether an eTLB has been enabled at a step 804. As may be appreciated, methods described herein may be utilized with several system configurations without departing from the present invention. Thus, in one embodiment of the present invention, methods are provided that access a TLB (non-enabled eTLB) utilizing a CAM structure. Accessing a TLB utilizing a CAM structure is specified by the MIPS architecture. If the method determines at a step 804 that an eTLB is not enabled, the method continues to a step 806 to search the CAM using a VA from the entryhi as a search key. The method then continues to a step 814 to determine whether a hit has occurred. If no hit occurs at a step 814, the method ends. If the method determines a hit (or match) has occurred at a step 814, the method continues to a step 816 to read a physical frame number (PFN) corresponding with a "hit" VA along with other information relevant to the "hit."

If the method determines at a step 804 that an eTLB is enabled, the method continues to a step 806, to search the CAM using a VA from the entryhi as a search key. The method substantially simultaneously continues to a step 808 to 1) Use a subset of the VA bits [m:n] to index the SAM, and 2) Read all indexed ways. The upper bits of the VA [MSB; m+1] are then compared with all the indexed ways at a step 810. As may be appreciated, any number of SAM structure banks may be searched without departing from the present invention. Thus, SAM structures 1 to n may be searched at steps 808/808' to 812/812'. The method then continues to a step 814 to determine whether a hit has occurred. If no hit occurs at a step 814, the method ends. If the method determines a hit (or match) has occurred at a step 814, the method continues to a step 816 to read a physical frame number (PFN) corresponding with a "hit" VA along with other information relevant to the "hit." As may be appreciated, a PFN corresponds with a physical address residing in memory. In this manner, a VA is translated to a PFN.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for utilizing a memory structure in a multi-core computer processing system, comprising:
   executing a plurality of threads by a plurality of processors in the multi-core computer processing system, wherein the multi-core computer processing system comprises a physical storage location and a translation buffer; and
   utilizing the translation buffer for cross-referencing virtual addresses with corresponding absolute addresses in the physical storage location, wherein the translation buffer comprises the memory structure, wherein the memory structure comprises a content addressable memory (CAM) structure and a set associated memory (SAM) structure, in which both the CAM structure and the SAM structure are utilized to read entries from the translation buffer such that the CAM structure is selected instead of the SAM structure when a criterion indicates enablement of the CAM structure and the SAM structure is selected instead of the CAM structure when the criterion indicates enablement of the SAM structure.

2. The method of claim 1, further comprising probing the CAM structure and SAM structure simultaneously, substantially simultaneously, or sequentially.

3. The method of claim 1, in which the criterion is a value within an index register to provide memory management functions.

4. The method of claim 1, further comprising probing the memory structure.

5. The method of claim 1, wherein the translation buffer is an extended translation look-aside buffer (eTLB).

6. The method of claim 1, further comprising configuring a memory management unit (MMU) configuration register.

7. The method of claim 1, further comprising enabling the SAM structure with an eTLB configuration register.

8. The method of claim 1, further comprising translating a virtual address into a physical address or page frame number (PFN).

9. The method of claim 1, in which the criterion corresponds to a value of an identifier.

10. The method of claim 1, in which the criterion is based at least in part on page size.

11. An apparatus for utilizing a memory structure in a multi-core computer processing system, comprising:
one or more processors to:
execute a plurality of threads, wherein the multi-core computer processing system comprises a physical storage location and a translation buffer; and
utilize the translation buffer to cross-reference virtual addresses with corresponding absolute addresses in the physical storage location, wherein the translation buffer comprises the memory structure, wherein the memory structure comprises a content addressable memory (CAM) structure and a set associated memory (SAM) structure, in which both the CAM structure and the SAM structure are utilized to read entries from the translation buffer such that the CAM structure is selected instead of the SAM structure when a criterion indicates enablement of the CAM structure and the SAM structure is selected instead of the CAM structure when the criterion indicates enablement of the SAM structure.

12. The apparatus of claim 11, wherein the CAM structure and SAM structure are probed simultaneously, substantially simultaneously, or sequentially.

13. The apparatus of claim 11, further comprising an index register to provide memory management functions.

14. The apparatus of claim 11, wherein the translation buffer is an extended translation look-aside buffer (eTLB).

15. The apparatus of claim 11, further comprising a memory management unit (MMU) configuration register.

16. The apparatus of claim 11, further comprising an eTLB configuration register to enable the SAM structure.

17. The apparatus of claim 11, wherein the memory structure is to translate a virtual address into a physical address or page frame number (PFN).

18. The apparatus of claim 11, wherein cross-referencing the virtual addresses with corresponding absolute addresses in the physical storage location is performed in a hardware circuit.

19. The apparatus of claim 11, in which the criterion corresponds to a value of an identifier.

20. The apparatus of claim 11, in which the criterion is based at least in part on page size.

21. A non-transitory computer readable medium having stored thereon a sequence of instructions which, when executed by a processor, causes said processor to execute a process for utilizing a memory structure in a multi-core computer processing system, the process comprising:
executing a plurality of threads by a plurality of processors in the multi-core computer processing system, wherein the multi-core computer processing system comprises a physical storage location and a translation buffer; and
utilizing the translation buffer for cross-referencing virtual addresses with corresponding absolute addresses in the physical storage location, wherein the translation buffer comprises the memory structure wherein the memory structure comprises a content addressable memory (CAM) structure and a set associated memory (SAM) structure, in which both the CAM structure and the SAM structure are utilized to read entries from the translation buffer such that the CAM structure is selected instead of the SAM structure when a criterion indicates enablement of the CAM structure and the SAM structure is selected instead of the CAM structure when the criterion indicates enablement of the SAM structure.

22. The medium of claim 21, further comprising probing the CAM structure and SAM structure simultaneously, substantially simultaneously, or sequentially.

23. The medium of claim 21, in which the criterion is a value within an index register to provide memory management functions.

24. The medium of claim 21, wherein the translation buffer is an extended translation look-aside buffer (eTLB).

25. The medium of claim 21, in which the process further comprises configuring a memory management unit (MMU) configuration register.

26. The medium of claim 21, in which the process further comprises enabling the SAM structure with an eTLB configuration register.

27. The medium of claim 21, further comprising translating a virtual address into a physical address or page frame number (PFN).

28. The medium of claim 21, in which the criterion corresponds to a value of an indentifier.

29. The medium of claim 21, in which the criterion is based at least in part on page size.

* * * * *

UNITED STATES PATENT AND TRADEMARK OFFICE
CERTIFICATE OF CORRECTION

| | | |
|---|---|---|
| PATENT NO. | : 8,082,416 B2 | |
| APPLICATION NO. | : 12/859013 | |
| DATED | : December 20, 2011 | |
| INVENTOR(S) | : Gaurav Singh | |

It is certified that error appears in the above-identified patent and that said Letters Patent is hereby corrected as shown below:

Column 12, Line 21, "structure wherein" should be replaced with --structure, wherein--.

Signed and Sealed this
Fourth Day of December, 2012

David J. Kappos
*Director of the United States Patent and Trademark Office*